United States Patent [19]

Habeeb

[11] Patent Number: 4,585,533

[45] Date of Patent: Apr. 29, 1986

[54] REMOVAL OF HALOGEN FROM POLYHALOGENATED COMPOUNDS BY ELECTROLYSIS

[75] Inventor: Jacob J. Habeeb, Sarnia, Canada

[73] Assignee: Exxon Research and Engineering Co., Florham Park, N.J.

[21] Appl. No.: 725,103

[22] Filed: Apr. 19, 1985

[51] Int. Cl.$^4$ .............................................. C02F 1/46
[52] U.S. Cl. .................................... 204/149; 204/131
[58] Field of Search ....................... 204/131, 136, 149

[56] References Cited

U.S. PATENT DOCUMENTS 2,209,981  8/1940  Keyl et al. .......................... 204/131
4,072,596  2/1978  Moeglich ............................ 204/241
4,131,526 12/1978  Moeglich ............................ 204/149

FOREIGN PATENT DOCUMENTS 0027745   4/1981  European Pat. Off. .
50081965 11/1973  Japan .................................... 204/149

Primary Examiner—R. L. Andrews
Attorney, Agent, or Firm—Edward H. Mazer

[57] ABSTRACT

A method for electrochemically removing halogen from a halogenated compound utilizing an electrically conducting liquid medium in an electrolytic cell is disclosed. Halogen is extracted and reacted with a metal present in the sacrificial anode to form a relatively insoluble metal halide salt. The invention is of particular utility in removing halogen from aromatic and aliphatic compounds.

19 Claims, No Drawings

REMOVAL OF HALOGEN FROM POLYHALOGENATED COMPOUNDS BY ELECTROLYSIS

BACKGROUND OF THE INVENTION

This invention generally is directed at the removal of halogenated compounds. More specifically, this invention is directed at the destruction of polyhalogenated compounds by electrolysis.

Polyhalogenated compounds, such as polychlorinated biphenyls (PCBs), have been widely used in industry for a variety of applications, including insulating fluids in electrical transformers and capacitors, and as pesticides. However, these polyhalogenated compounds, particularly polychlorinated compounds, have been found difficult to destroy by conventional methods such as incineration because of high costs, incomplete combustion and the possibility that the chlorine liberated will react with water to form hydrochloric acid. Disposal of these compounds in landfill is not preferred because of the toxicity and long-term stability of these compounds. Other methods of destruction of these compounds, such as replacement of the chlorine present by other halogens, such as fluorine, are not preferred because the compounds produced also may be hazardous. Moreover, replacement of chlorine by fluorine may necessitate the use of relatively expensive materials of construction. Considerable work has been disclosed in the literature on the destruction of chlorinated compounds, including polychlorinated compounds.

European Patent Application No. 27,745 discloses a process for the electrochemical degradation of chlorinated compounds. The chlorinated compounds are placed in an electrolyte solution. An electrical charge is passed through the solution causing the chlorinated compounds to react with other molecules to form larger chlorinated molecules having a lower oxidation potential in the case of anodic oxidation, or a lower reduction potential in the case of cathodic reduction than that of the original chlorinated compounds. A divided cell preferably is used to prevent migration of the stable intermediates back to the opposite electrode. The solvent used may be aqueous, with supporting electrolyte added where needed, and at least one compound which reacts with the cation radicals formed to form compounds having a lower oxidation or reduction potential than the original compound. The non-sacrificial electrodes utilized may include carbon, platinum and steel. Preferred solutions comprise sulfuric acid and water. Solutions are disclosed in which acetonitrile, acetonitrile/water with sodium perchlorate added, and solutions of ethanol with sodium perchlorate or sulfuric acid are added for the degradation of chlorinated compounds, including polychlorinated biphenyls (PCBs). However, this process is not favored because the chlorinated compounds are not decomposed to non-toxic compounds but, rather, only reacted to form higher molecular weight chlorinated molecules. In addition, the process described in this patent requires that anodic oxidation potential and cathodic-reduction potential of the system (i.e. reactants in the cell) be smaller than the discharge potential of the solvent component, or solvent/reactive component, of the aqueous system. This, in effect, may require that the electropotential of the system be measured for each material that is to be reacted before and during the process. Failing to do so may result in the reformation of the starting material. Moreover, the relatively low electrochemical potential will result in a relatively low rate of reaction.

Japanese Kokai J50081965 teaches the electrolytic conversion of PCBs to their fluorinated analogs in the presence of calcium fluoride. The resulting fluorinated compounds are removed by adsorption. However, this process is not favored, since the resulting fluorinated compounds may be hazardous and the replacement of chlorine by fluorine is slow and does not go to completion.

U.S. Pat. Nos. 4,072,596 and 4,131,526 disclose apparatus for removing compounds which are difficult to oxidize, such as PCBs, by the use of a vessel containing stacked beds having the characteristics of alternating high and low electrical conductivity with separately controlled pairs of electrodes for the two alternate types of beds. An aqueous solution containing the contaminants passes through the successive beds and is subjected to an alternating current field for decomposition of the contaminants in the high resistivity beds, and oxidation in the lower resistivity beds by hydrogen peroxide produced in situ by the alternating current electrolysis of water. In Example III of the '596 patent the concentration of PCBs in an aqueous solution was reduced by passing the solution through the previously described apparatus and applying 29 volts, 12 amps to the electrodes of one series of beds, and 10 volts, 15 amps to the other series of beds. This process is not particularly useful, since it is limited to aqueous system having very low concentrations of PCBs.

Accordingly, it is desirable to provide a process for the decomposition of halogenated compounds, such as polychlorinated biphenyls, and aliphatic halogenated pesticides.

It also is desirable to provide a process in which the chlorine is reacted to form a relatively insoluble, easily disposable compound.

It also is advantageous to provide a process which can be utilized for the decomposition of a wide variety of chlorinated organic compounds without measuring the electrochemical potential of each compound prior to decomposition.

It would be a further advantage to utilize a process which decomposes the chlorinated organic compounds quickly in a relatively simple electrolysis cell without the use of expensive electrodes or catalysts and without the production of hazardous by-products.

The present invention is directed at a method for electrochemically removing halogens, such as chlorine, from hydrocarbons, particularly aromatics, at the anode of an electrochemical cell. The present invention is directed at the use of a sacrificial anode and an electrolyte solution.

SUMMARY OF THE INVENTION

The present invention is directed at a method for electrochemically removing halogen from a halogenated compound in an electrolytic cell. The method comprises:

A. adding the halogenated compound to an electrolytic cell comprising:
   i. a sacrificial anode selected from the group consisting of transition metals, lithium, potassium, sodium, indium, titanium, gallium and mixtures thereof;
   ii. a cathode; and,
   iii. an electrically conducting liquid medium;

B. applying an electrical current to the electrolytic cell whereby halogen in the halogenated compound is extracted and reacted with a metal present in the sacrificial anode to form a metal halide.

The current utilized in the electrolytic cell may range between about 50 milliamps and about 1 amp, preferably between about 100 and about 400 milliamps. The voltage may range between about 2 and about 50 volts, preferably between about 10 and about 20 volts. The electrolytic cell comprises a sacrificial anode selected from the group of metals consisting of transition metals, lithium, potassium, sodium, indium, titanium, gallium and mixtures thereof, with iron, nickel, zinc, copper and lithium being preferred. The cathode utilized is not critical, and preferably may comprise iron and carbon. The electrically conducting liquid medium may comprise any liquid medium capable of conducting an electrical current. The electrically conducting liquid medium may be selected from the group of solvents consisting of amines, nitriles, alcohols, ketones, acids, amides, imides, water and mixtures thereof. The electrically conducting liquid medium optionally may further comprise an electrolyte, such as tetraalkylammonium halide, tetraalkylammonium perchlorate and mixtures thereof. Where an electrolyte is utilized in combination with a solvent, the electrolyte normally comprises between about 0.005 and about 0.02 weight percent, preferably between about 0.010 and about 0.015 weight percent. The concentration of the halogenated compound in the electrically conducting liquid medium may range between about 2 ppm and about 90 weight percent, preferably between about 2 ppm and about 50 weight percent. The halogenated compound may be a halogenated hydrocarbon, such as a halogenated aliphatic or aromatic.

DETAILED DESCRIPTION OF THE INVENTION

The present invention is directed at a method for decomposing halogenated compounds, such as hydrocarbons, and particularly aromatics. In the present invention, the halogens are removed at the anode of the electrolysis cell.

The electrolysis cell utilized in the present invention comprises a sacrificial anode selected from the group consisting of transition metals, lithium, potassium, sodium, indium, titanium, gallium and mixtures thereof. The transition metals comprise elements 21 through 29 (scandium through copper), 39 through 47 (yttrium through silver), 57 through 79 (lanthanum through gold) and all known elements from 89 (actinium) on, of the Periodic Table. Among the preferred metals are iron, nickel, zinc, copper and lithium. The particular anode utilized will be a function of several factors, including cost, ease of handling and availability. The cathode utilized in the present invention also is not critical and preferably comprises iron or copper. The anode and cathode utilized may comprise relatively impure metals. The electrically conducting liquid medium utilized must be an electrolyte, i.e., capable of providing ionic conductivity. The electrically conducting liquid medium utilized may comprise a solvent selected from the group consisting of amines, nitriles, alcohols, ketones, acids, amides, imides, water and mixtures thereof. The electrically conducting liquid medium optionally may further comprise an electrolyte, such as tetraalkylammonium halide, tetraalkylammonium perchlorate or mixtures thereof. Where an electrolyte is utilized with a solvent, the electrolyte normally comprises between about 0.005 and about 0.02 weight percent of the electrically conducting liquid medium, perferably between about 0.010 and about 0.015 weight percent.

The electrical current utilized in the present electrolytic cell normally will range between about 50 milliamps and about 1 amp, preferably between about 100 and about 400 milliamps, while the voltage across the cell may range between about 2 and about 50 volts, preferably between about 10 and about 20 volts. The concentration of the halogenated hydrocarbon present in the electrically conducting liquid medium will be a function of several factors, including the particular halogenated hydrocarbon which is to be decomposed, the particular sacrificial anode present, the electrochemical potential utilized and the chemical composition of the electrically conducting liquid medium. The halogenated hydrocarbon preferably comprises between about 2 ppm and about 90 weight percent of the electrolyte solution, preferably between about 2 ppm and about 50 weight percent, more preferably between about 2 ppm and about 30 weight percent.

Where the halogenated aromatic comprises a polychlorinated biphenyl, the concentration of the PCB in the solution normally ranges between about 2 ppm and about 20,000 ppm, the electrochemical potential ranges between about 5 and about 20 volts, the current ranges between about 50 and about 500 milliamps, and the sacrificial anode preferably is selected from the group consisting of copper, iron, zinc, lithium and mixtures thereof.

While the patentability of the present invention is not predicated upon any theory, it is believed that halide is extracted from the aromatic ring by the reaction of the metal cation in solution with the halogen and the carbon of the aromatic in the C—X bond to form a metal halide with the resulting carbon radical forming either a C—C bond with another carbon radical, or taking hydrogen from another hydrocarbon, solvent or water.

The following Examples demonstrate the utility of the present invention in extracting chlorine from a chlorinated aromatic.

EXAMPLE 1

A 150 ml. beaker was utilized as the electrolysis cell, with 50 gram copper sheets 3 cm., by 16 cm. or iron rods each flattened at one end to a 3 cm. by 5 cm. segment, serving as both the sacrificial anode and also as the cathode. The electrolytic solution comprised 100 ml. total of methanol, acetonitrile or mixtures thereof and 150 mg. of tetraethylammonium perchlorate. To this mixture were added various pure chlorinated compounds or oils having chlorinated compounds present. A voltage of 11 volts at 250 milliamps was applied for five hours to each of the samples. The chloride was removed from each sample as copper chloride when copper was utilized for the anode and cathode, or as iron chloride when iron was used as the anode and cathode due to the reaction of the chlorine with the sacrificial anode. The weight percent of chlorinated aromatics which was destroyed was determined by gas chromatography and quantitative determination of the copper chloride or iron chloride produced. The results are set forth in Table I below.

TABLE I
DECOMPOSITION OF CHLORINATED COMPOUNDS USING ELECTROLYSIS

| Chlorinated Compound | Sacrificial Anode | Solvent | Wt. % of Chlorinated Compound Destroyed |
|---|---|---|---|
| Chlorobenzene | Iron | Methanol | 81 |
| Dichlorobenzene | Copper | Methanol | 95 |
|  | Copper | Acetonitrile | 75 |
| 2,4,5 Trichloro-phenol | Copper | Methanol | 68 |
| Used Engine Oil Containing 0.4 Wt. % Chlorinated Compounds | Iron | Methanol | 77 |
|  | Copper | Methanol | 87 |
| Used Engine Oil Light Distillate Containing 0.2 Wt. % Chlorinated Compounds | Copper | Methanol Acetonitrile 1:1 | 100 |

EXAMPLE 2

In another test a flat bottom tube 3 cm in diameter and 12 cm long was used as the electrolysis cell. Twenty-five mg of a polychlorinated biphenyl, Aroclor 1254, a commercially available material manufactured by Monsanto, was added to an electrically conducting liquid medium comprising a solution of 1 ml acetonitrile, 5 ml methanol and 15 ml toluene, with 150 mg of tetraethylammonium chloride added as the supporting electrolyte. The anode comprised a 2 cm by 2 cm zinc sheet, while the cathode comprised a 2 cm by 2 cm platinum sheet. A current of 100 milliamps at 11 volts was applied.

Immediately after the start of electrolysis a white precipitate comprising zinc chloride formed on the anode and subsequently settled at the bottom of the cell. At the end of the electrolysis period the solvent was filtered and transferred to another vessel to which 25 ml of 60 neutral base oil was added. The solution then was heated to 55° C. for 30 minutes to dissolve the remaining PCB and its degradation products. Laboratory analyses of oil samples before and after electrolysis disclosed that the initial PCB content of 1000 ppm had been reduced to 440 ppm after electrolysis.

EXAMPLE 3

An electrolysis cell similar to that of Example 2 was utilized. Twenty-five grams of a Arochlor 1254, again were added to a solution comprising 1 ml acetonitrile, 3 ml methanol, 15 ml toluene and 150 mg of tetraethylammonium perchlorate. The anode and cathode both comprised 2 cm by 2 cm zinc sheets. The solution was filtered as in Example 2, with 40 ml of 60 neutral base oil added as diluent. Laboratory analyses similar to those described in Example 1 indicated that electrolysis had reduced the PCB content of the electrically conducting liquid medium from 858 ppm to 410 ppm.

What is claimed is:

1. A method for electrochemically removing halogen from a halogenated compound in an electrolytic cell, said method comprising:
   A. adding the halogenated compound to an electrolytic cell comprising:
      i. a sacrificial anode selected from the group consisting of transition metals, lithium, potassium, sodium, indium, titanium, gallium and mixtures thereof;
      ii. a cathode; and,
      iii. an electrically conducting liquid medium;
   B. applying an electrical current to the electrolytic cell whereby halogen in the halogenated compound is extracted and reacted with a metal present in the sacrificial anode to form a metal halide.

2. The method of claim 1 wherein the current applied to the electrolytic cell ranges between about 50 milliamps and about 1 amp.

3. The method of claim 2 wherein the current applied to the electrolytic cell ranges between about 100 and about 400 milliamps.

4. The method of claim 2 wherein the voltage applied to the electrolytic cell ranges between about 2 and about 50 volts.

5. The method of claim 4 wherein the voltage applied to the electrolytic cell ranges between about 10 and about 20 volts.

6. The method of claim 4 wherein the electrically conducting liquid medium electrolyte is selected from the group of solvents consisting of amines, amides, imides, nitriles, alcohols, ketones, acids, water and mixtures thereof.

7. The method of claim 6 wherein the electrically conducting liquid medium further comprises an electrolyte selected from the group consisting of tetraalkylammonium halide, tetraalkylammonium perchlorate, or mixtures thereof.

8. The method of claim 6 wherein the anode is selected from the group consisting of transition metals, lithium, potassium, sodium, indium, titanium, gallium, and mixtures thereof.

9. The method of claim 8 wherein the anode is selected from the group consisting of copper, iron, zinc, lithium and mixtures thereof.

10. The method of claim 9 wherein the cathode is selected from iron, carbon and mixtures thereof.

11. The method of claim 10 wherein the halogen removed from the halogenated compound forms a relatively insoluble metal halide salt.

12. The method of claim 11 wherein the metal halide salt is removed by precipitation and/or filtration.

13. The method of claim 11 wherein the halogenated compound comprises a halogenated hydrocarbon.

14. The method of claim 13 wherein the halogenated hydrocarbon is selected from the group consisting of halogenated aromatics and halogenated aliphatics.

15. The method of claim 13 wherein the halogenated hydrocarbon comprises a chlorinated hydrocarbon.

16. The method of claim 15 wherein the chlorinated hydrocarbon comprises a polychlorinated biphenyl.

17. The method of claim 16 wherein the concentration of polychlorinatd biphenyl in the solution ranges between about 2 ppm and about 90 weight percent.

18. The method of claim 17 wherein the concentration of the polychlorinated biphenyl in the solution ranges between about 2 ppm and about 50 weight percent.

19. A method for electrochemically removing halogen from a halogenated hydrocarbon in an electrolytic cell, said method comprising:
   A. adding the halogenated hydrocarbon to an electrolytic cell comprising:
      i. a sacrificial anode selected from the group of metals consisting of copper, iron, zinc, lithium and mixtures thereof;

ii. a cathode selected from the group consisting of iron, carbon and mixtures thereof;
iii. an electrically conducting liquid medium comprising a solvent and an electrolyte;

B. applying a current ranging between about 50 milliamps and about 1 amp, at a voltage ranging between about 2 and about 50 volts to the electrolytic cell whereby halogen in the halogenated compound is extracted and reacted with a metal present in the sacrificial anode, to form a relatively insoluble metal halide salt;

C. removing the metal halide salt by precipitation and/or filtration.

* * * * *